Figures 1, 2:
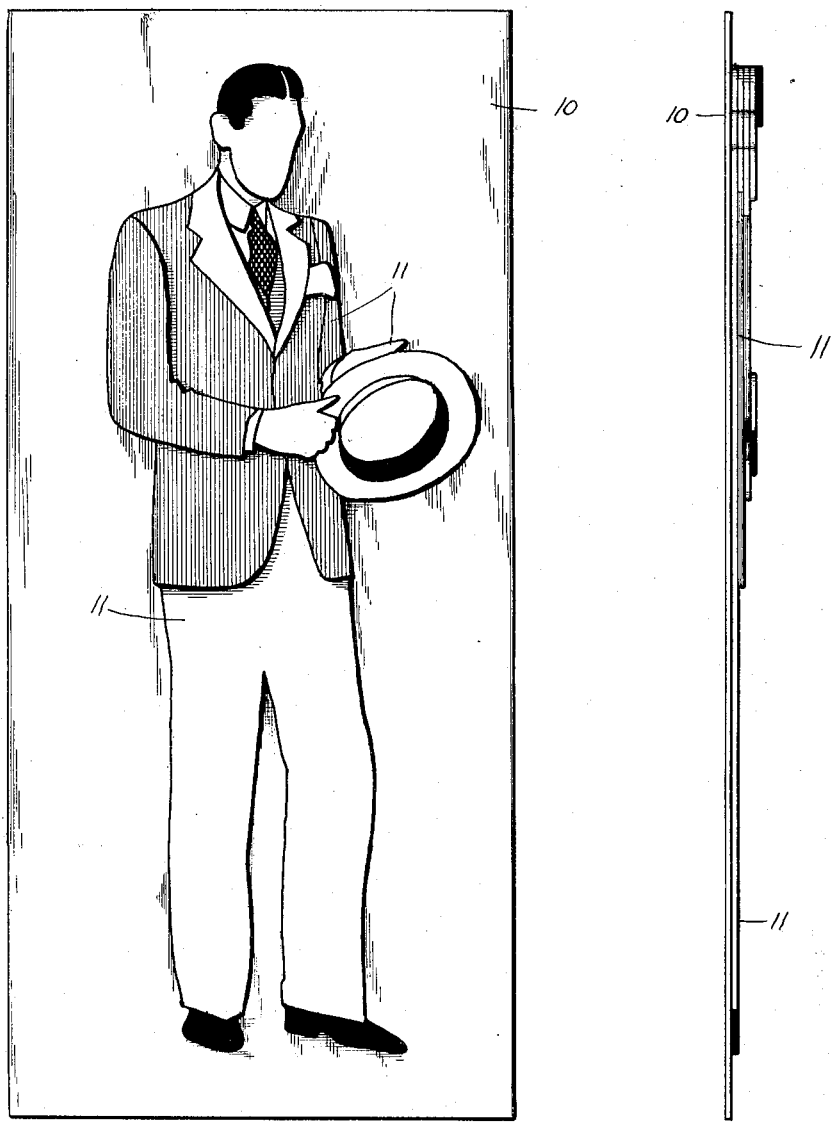

Dec. 1, 1925. 1,563,485

L. R. HALES

DISPLAY DEVICE

Filed Sept. 29, 1924

LANDY R. HALES Inventor

By his Attorney Edwin Leursohn

Patented Dec. 1, 1925.

1,563,485

UNITED STATES PATENT OFFICE.

LANDY R. HALES, OF NEW YORK, N. Y.

DISPLAY DEVICE.

Application filed September 29, 1924. Serial No. 740,576.

*To all whom it may concern:*

Be it known that LANDY R. HALES, a citizen of the United States, residing at New York city, New York, has invented new and useful Improvements in Display Devices, of which the following is a specification.

My invention relates to display devices and more particularly to commercial advertising arrangements constructed of cut out layers of veneer or cardboard for reproducing and illustrating articles for sale, magazines, posters and similar art works.

The principal object of the invention is to provide a display picture having depth of relief, combinations of colors and a general attractive appearance, all of which being produced by cut out layers of material superposed on each other, as hereinafter fully described and illustrated in the accompanying drawing, in which:

Figure 1 is a front elevational view of my improved display device and Figure 2 is an edge view of the same showing the layers of material which form the design.

Referring to the drawing, 10 denotes the background comprising a flat piece of wood or cardboard upon which the reproduction is mounted. The reproduction consists of a plurality of layers 11, the lowermost of which comprises the full outline of the picture and the design is produced by cutting out certain portions of the superposed layers. It will be noted that each succeeding layer comprises the full outline of the part of the picture it produces and also the part which underlies the next succeeding layer of material.

If the reproduction is a picture requiring color to complete the effect, as illustrated: the parts represented may be provided with a flat color, such as a blue jacket, flesh color face and hands and black hair, hat band and shoes.

What I claim is:

1. A rigid display device comprising a plurality of superimposed layers of substantially plane rigid material, lowermost layer comprising the full design and having a portion at least of one of its faces of greatest area exposed to view, and each succeeding layer also having a portion at least of one of its faces of greatest area exposed to view, the several layers each forming a constituent part of a relief design.

2. A display device comprising a plurality of substantially superimposed layers of material, one layer comprising the full outline of the design and having a portion at least of one of its faces of greatest area exposed to view, and each succeeding layer also having a portion at least of one of its faces of greatest area exposed to view, the several layers each forming a constituent part of a relief design.

3. A display device comprising a plurality of superimposed layers of substantially plane material one layer comprising the full outline of the design and having a portion at least of one of its faces of greatest area exposed to view, and each succeeding layer also having a portion at least of one of its faces of greatest area exposed to view, the several layers each forming a constituent part of a relief design.

4. A display device comprising a plurality of substantially superimposed layers of material, one of the layers thereof comprising the full outline of the design and each succeeding layer being of a size and shape to preform its portion of the design and to substantially underlie the next succeeding layer of material, the sides of each layer forming an angle with the plane of the layer to accentuate the relief appearance of each layer.

5. A display device comprising a plurality of substantially superimposed layers of material the lowermost thereof comprising the full outline of the design and each succeeding layer being of a size and shape to preform its portion of the design and to substantially underlie the next succeeding layer of material, the sides of each layer being perpendicular to the plane of the layer to accentuate the relief appearance of each layer.

In testimony whereof, LANDY R. HALES, has signed his name to this specification this 13 day of September 1924.

LANDY R. HALES.